May 28, 1929.  J. F. SURDAM ET AL  1,715,314
ANTIFREEZING SILL COCK
Filed Dec. 1, 1927
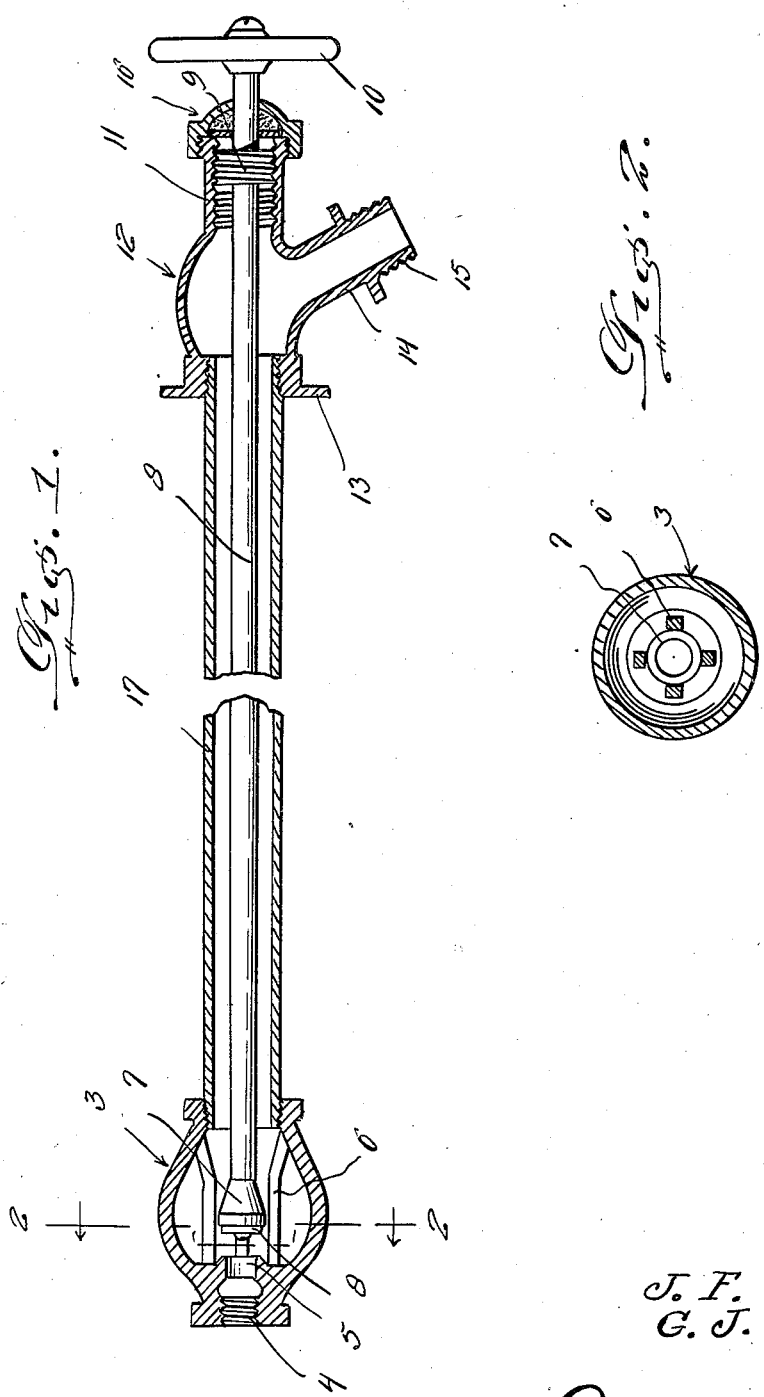
Inventors
J. F. Surdam,
G. J. Brown,
By Clarence A. O'Brien
Attorney Patented May 28, 1929.

1,715,314

UNITED STATES PATENT OFFICE.

JESSE F. SURDAM AND GLEE J. BROWN, OF PONTIAC, MICHIGAN.

ANTIFREEZING SILL COCK.

Application filed December 1, 1927. Serial No. 237,060.

This invention relates to an improved sill cock constructed with a view toward guarding against bursting and breakage from frost and freezing.

The invention has more particular reference to that class wherein the operating means for the valve elements is located at a point remote from the supply pipe, the valve seats and valve elements being disposed on the interior to prevent exposure to the outside temperature, and the operating means being located on the exterior in a convenient position for ready manipulation.

Our principal aim is to generally improve upon inventions of this class by providing one which is individual in construction, and characterized by an arrangement of details which cooperate in forming a highly practicable and dependable structure.

Other features and advantages of the invention will become apparent from the following description and drawings.

In the drawings:—

Figure 1 is a longitudinal section through a sill cock constructed in accordance with the present invention.

Fig. 2 is a cross section taken approximately upon the plane of the line 2—2 of Fig. 1.

Referring now to the drawings by reference numerals, it will be observed that the reference character 3 designates a substantially bulbous shaped valve casing having a screw threaded connection 4 adapted to be connected with the supply pipe, and provided with an internal diaphragm centrally apertured to provide a valve seat, 5. The body is provided on its interior with a series of longitudinally extending circumferentially guide rods 6, arranged around the valve seat in a manner to form a cage for the longitudinally movable valve head 7. The valve head is somewhat conical in form, and it carries a removable washer 8 adapted to be forced firmly against the valve seat 5.

The valve head is carried on the inner end of an elongated valve operating stem or rod 8, having an outstanding screw threaded portion 9 adjacent the outer end. On the outer end is a hand wheel 10 by means of which the stem is rotated. The screw threaded portion 9 is tapped into the internally screw threaded part 11 of the faucet 12. The faucet comprises a casting of the general configuration shown and also includes the flanged sill connection 13, and the downwardly inclining nozzle 14, terminating in a screw threaded hose connection 15.

Removably mounted on the screw threaded part 11 is a closing and packing cap 16 providing a fluid-tight joint about the valve stem. The faucet 12 is connected with the valve body 3 through the medium of an elongated pipe 17. It is of course obvious that in practice the valve body 3 is suitably connected with a water supply pipe, whereas the faucet located on the exterior of the sill of the building, where the hand wheel 10 is readily accessible for operation, and where the hose can be easily connected and disconnected.

With this arrangement, the valve 7 can be opened and closed from a remote point, and since the water collected in the pipe 17 will be readily drained out after operation, it is obvious that freezing and consequent bursting of the parts is substantially prevented.

Particularly do we wish to emphasize certain structural advantages such as serve to lend distinctiveness to our device. For example, by having the operating screw near the hand wheel, it is very easy to open and close the valve and this does away with unusual portional twist and strain upon the valve rod. The presence of the guide in the valve body insures a firm and accurate seating of the valve and permits the supply of water to be regulated. The separable connection of parts permits the replacement and it is also obvious that by having the screw caps on the faucet removable, the entire valve rod can be easily slipped out for repairs if necessary.

The combined advantages of this arrangement of parts insures a characteristic structure which can be depended upon to perform the desired result in an efficient manner.

It is believed that by considering the description in connection with the drawings, a clear understanding of the invention will be had. Therefore, a more lengthy description is thought unnecessary.

Minor changes in shape, size and re-arrangement of parts coming within the field of invention claimed may be resorted to if desired.

Having thus described our invention, what we claim as new is:—

In a sill cock construction, of the class described, a substantially bulbous shaped valve body provided with a pipe connection and an internal apertured partition forming a valve seat, and an internal valve guiding means in the form of a cage composed of longitudinal circumferentially spaced rods, a faucet having an inclined nozzle provided with a hose connection, and further provided with an outstanding internally screw threaded portion, a packing retaining cap carried by said screw threaded portion, a valve rod provided with an outstanding screw threaded part tapped into said screw threaded portion, a hand wheel carried by said rod and located adjacent said faucet, a valve head on the inner end of the rod and located in said body and cooperable with said guide rods and valve seat, and a pipe connection between the valve body and faucet, said pipe surrounding said valve rod.

In testimony whereof we affix our signatures.

JESSE F. SURDAM.
GLEE F. BROWN.